United States Patent [19]

Sato

[11] 4,354,224
[45] Oct. 12, 1982

[54] MANIPULATION-VARIABLE SEPARATED TYPE SYSTEM CONTROL METHOD AND APPARATUS

[75] Inventor: Takao Sato, Ibaraki, Japan
[73] Assignee: Hitachi, Ltd., Tokyo, Japan
[21] Appl. No.: 141,798
[22] Filed: Apr. 21, 1980

[30] Foreign Application Priority Data

Apr. 25, 1979 [JP] Japan .................................. 54-50351

[51] Int. Cl.³ ........................ G05B 11/18; G05B 11/42
[52] U.S. Cl. ..................................... 364/183; 364/167
[58] Field of Search ................ 364/118; 318/611, 632, 318/561

[56] References Cited

U.S. PATENT DOCUMENTS 3,646,454  2/1972  Southern .......................... 364/118 X
4,143,415  3/1979  Klingbell ......................... 364/118 X
4,250,543  2/1981  Smith et al. ...................... 364/118 X

FOREIGN PATENT DOCUMENTS 1073228  1/1960  Fed. Rep. of Germany .
1302871  11/1970  Fed. Rep. of Germany .

Primary Examiner—David H. Malzahn
Attorney, Agent, or Firm—Antonelli, Terry & Wands

[57] ABSTRACT

Manipulation-variable separated type control method and apparatus are used in a control system with a control element and a feedback element for an object being controlled or controlled object. The apparatus comprises a detector for detecting a relative value of a controlled variable, a first adder for applying a difference between a relative value output of the relative value detector and a relative reference value, and a second adder totalizing an output of the control element and an absolute reference value, for generating a signal representative of a manipulation variable for the controlled object. The absolute reference value for the manipulation variable is set to a nominal reference value for the controlled object in normal operation and applied to the controlled object irrespective of disturbances of the system. The relative reference value for the controlled variable is normally variable within an allowable change range of the controlled variable and is set such that the change of the manipulation variable determined by a deviation from the detected relative value is minimized for the absolute reference value.

9 Claims, 6 Drawing Figures

MANIPULATION-VARIABLE SEPARATED TYPE SYSTEM CONTROL METHOD AND APPARATUS

BACKGROUND OF THE INVENTION

The present invention relates to modified feedback control techniques and more particularly to a manipulation-variable separated or a divided type control method and apparatus which are applicable to the continuous and/or discrete control of process quantities such as flow rate, temperature, electric current and the like.

Typically, a feedback control system as shown in FIG. 1 is incorporated in a prior art control system for use in the control of flow rate and temperature.

In such a control system, as well known in the art, the following relations are established between a reference value S of the controlled variable applied to a set point, a feedback variable D, a deviation $\epsilon$ and a manipulation variable $C_o$ for an object or system 13 being controlled $$\epsilon = S - D \tag{1}$$

$$C_o = G(S)\epsilon \tag{2}$$

where $G(S)$ is a transfer function of a control element 12.

Thus, in the control system, the deviation $\epsilon$ between reference value S and feedback variable D is determined at a summing point 11 and processed at the control element 12 by subjecting it to a proportional (P) operation, proportional plus integral (PI) operation or proportional plus integral plus derivative (PID) operation so as to be applied, in the form of a manipulation variable, to the object or system being controlled (hereinafter referred to as the controlled object), whereby the control operation is carried out to make the deviation $\epsilon$ zero. The controlled variable is detected in terms of an absolute value by an absolute-value detector 16 connected to a point 17 of the controlled object 13. A signal of the detected absolute-value is subjected to a given transformation at a feedback circuit 14 to produce a feedback signal D. As will be described later, between the control element 12 and the controlled object 13 is connected a change rate limiter 15' which confines, as desired, the change rate of a manipulation variable within a fixed range. The limiter 15' normally acts to limit the output of the control element 12 and produces an output on a line 15.

Of various configurations of existing control systems, the construction shown in FIG. 1 is typical and popular for the control of analog quantities.

With the feedback control system of FIG. 1, if the feedback loop is placed in a disconnected state for some reason, $\epsilon = S$ results from $D = 0$ as will be seen from equation (1) and the instant the feedback loop is opened, a great disturbance is exerted on the control system.

Accordingly, when the object being controlled has a quick response and hence the exertion of such a disturbance is not allowable, it is general practice to set up the control system redundantly or to provide the change rate limiter 15' for the purposes of making a fail safe system. However, the redundant control system needs a complicated control apparatus and is expensive. The provision of the change rate limiter impairs the response of the control system and is liable to failure to attain the intended control. Meanwhile, the recent widespread use of digital computers in process control is remarkable. In this type of process control, a sampling control system is employed whose control scheme per se has a preference for incorporation of the feedback control system as shown in FIG. 1. However, even in an instance where the adder 11, control element 12 and feedback circuit 14 are digitized, the above problems inherent to the feedback system, that is, the problems concerning reliability, stabilization and simplification of the system still remain unsolved.

SUMMARY OF THE INVENTION

Accordingly, it is an object of the present invention to provide a manipulation-variable separated type control method using a feedback loop which can assure highly reliable process control and an apparatus implementing the method.

Another object of the present invention is to provide a manipulation variable divided type control method using a feedback loop which can assure highly accurate process control and an apparatus for implementation of the method.

Another object of the present invention is to provide a modified feedback control method and apparatus of simplified configuration which can assure safety of the process control upon disconnection of the feedback loop.

Still another object of the present invention is to provide a manipulation-variable separated type, modified feedback control apparatus being suitable for both the analog and sampling controls.

The basic technical conception of this invention resides in that in the case where the continuous and/or sampling control of physical quantities of a controlled object is carried out in a feedback type process control, a manipulation variable $C_o$ is divided into an absolute reference value (absolute desired value) $C_1$ for the manipulation variable which is set independent of possible occurring disturbances and a relative change $C_2$ of the manipulation variable which is determined through a control operation based on a deviation between a detected relative change of the controlled variable with respect to a reference value therefor and a relative reference value for the controlled variable, and the manipulation variable $C_o$ is applied to the controlled object while satisfying a relation which is $C_1 >> C_2$. Accordingly, the following relation stands:

$$C_o = C_1 + C_2 \tag{3}$$

The relative reference value is determined dependent on an allowable change range of the controlled variable in the process, i.e., a critical safety factor in the process. The relative reference value achieves the same effects as the prior art feedback control with its large value, so that it is normally set to be zero.

DESCRIPTION OF THE PREFERRED EMBODIMENTS

The invention will now be described by way of examples with reference to the drawings.

Figure 1:
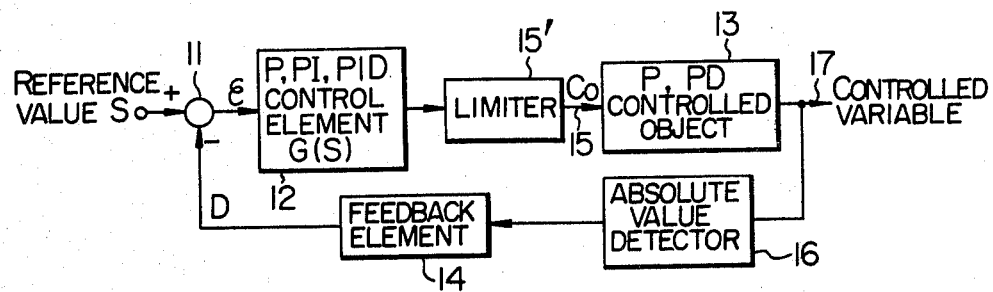
FIG. 1 is a block diagram showing an example of a prior art feedback control system.
Figure 2:
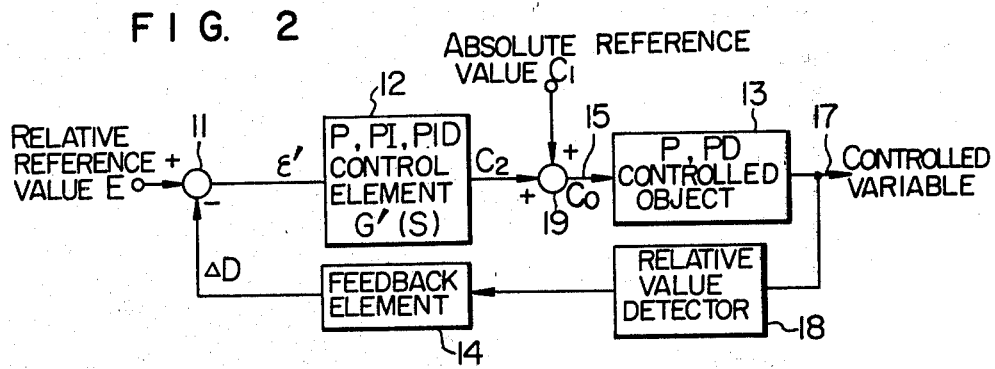
FIG. 2 is a block diagram showing a fundamental construction of a manipulation variable separated type control system with a feedback system according to the present invention.

A general form embodying the invention is best shown in FIG. 2 in which the same parts as those of FIG. 1 are designated by the same reference numerals.

In the control system shown in FIG. 2, a control element 12 does not receive a deviation between the reference value S and an absolute value of the feedback variable D but receives a deviation $\epsilon' = E - \Delta D$ where E represents a relative reference value with respect to a reference value for the controlled variable and $\Delta D$ a relative feedback variable with respect to the relative reference value. A P operation or PD operation type controlled object 13 is controlled by an output of an adder 19 which produces a sum $C_o = C_1 + C_2$ based on an output $C_2$ of the control element 12 having a function to perform a P, PI or PID operation and a reference value signal $C_1$ which determines an absolute value of the manipulation variable. The determination of $C_1$ and $C_2$ depends on an allowable change in the controlled variable during a predetermined time in the object or process being controlled. Assuming now that the reference value of the controlled variable is $L_o$ and an allowable limitative value for a response time $\Delta t$ is $L_1$, an allowable change range $\sigma$ is denoted by, $$\sigma \leq \left| \frac{L_o - L_1}{\Delta t} \right|.$$

Accordingly, it will be seen that values of the allowable change range are determined dependent on the natures of the process per se and the critical safety factor required for the process operation. For example, the response time $\Delta t$ is several of tens of seconds for an embodiment of FIG. 4 and of the order of milli-seconds for an embodiment of FIG. 5 to be described later. Thus, setting of $C_1$ and $C_2$ is such that the controlled variable lies within the allowable change range $\sigma$.

In contast to the fact that the detector 16 of the prior art control system detects an absolute value of the controlled variable, a detector 18 of the control system according to the present invention detects, as shown in FIG. 2, only a relaive change of the controlled variable with respect to a reference value therefor in terms of a reference i.e., a deviation from the controlled variable command. The detector 18 then acts as a relative value detector and persons skilled in the art can readily realize the detector in the form of sensors available on the market as adapted to controlled physical quantities used in the process.

With the control system of the above arrangement, the absolute reference value $C_1$ of the manipulation variable is normally supplied from an absolute set point as shown in FIG. 2. When the reference value for the controlled variable is satisfied with the absolute reference value $C_1$, an input signal $\epsilon'$ to the control element 12 becomes zero, reducing to $C_2 = 0$ with time t being infinite.

When the reference value for the controlled variable is not satisfied with the absolute value $C_1$, $\epsilon' \neq 0$ results and an appreciable input $\epsilon'$ is subjected to a PID operation, for example, at the control element 12 in accordance with a transfer function $G'(S)$ thereof so as to produce a change $C_2$ of the manipulation variable, thereby causing the controlled variable to be corrected to its reference value. To determine the input signal $\epsilon' = E - \Delta D$ to the control element, an output $\Delta D$ of the feedback loop produced by performing a required operation for an output of the relative value detector 18 at a feedback element 14 is applied to one input of an adder 11 and a relative reference value E for the controlled variable applied to a relative set point is applied to the other input of the adder 11. The relative reference value E is set, as described above, to satisfy the allowable change range $\sigma$ in the process and $C_1 >> C_2$ but is normally set to zero.

When the reference value for the controlled variable is desired to be varied, either the relative reference value E or the absolute reference value $C_1$ for the manipulation variable is changed. Then, $\epsilon' \neq 0$ is obtained, reducing to $$C_2 = G'(S)\epsilon' \quad (4)$$

An output of the control element 12 as represented by equation (4) is superimposed on the normally fixed $C_1$ to perform the automatic control of the controlled object 13. Automatic correction of a total manipulation variable $C_o$ continues until the output $\Delta D$ of the feedback element 14 receiving the signal of the detector 18 which detects only a relative change of the controlled variable satisfies, $$\epsilon' = E - \Delta D = 0 \quad (5).$$

When a maximum disturbance occurs and hence maintenance of the critical safety factor of the process operation is required, the absolute reference value $C_1$ is fixed and the relative reference value E is varied within the range $\sigma$ of allowable change in order to effect a slight change in the controlled variable.

On the other hand, when a programmed operation is required of the process, the change range for the controlled variable becomes large in general and the allowable change range $\sigma$ is disturbed. Accordingly, it is desired to make the relative reference value zero and to vary the absolute reference value $C_1$ on the basis of a program so that the reference value for the relative value detector 18, i.e., the reference value for the controlled variable may also be changed simultaneously with interrelation to a change in the absolute reference value $C_1$. In other words, when a large variation in the controlled variable is desired, $E = 0$ is established and an interrelated variation is performed between the absolute reference value $C_1$ and a new reference value for the relative value detector.

It should be appreciated from the foregoing operational description of the control system according to the present invention that while the control element 12 of the prior art feedback control system is applied with a large input immediately when the feedback loop is disconnected for some reason, the control system of this invention is immune to the internal failures in the absence of the disturbances since values of the relative reference value E and feedback variable $\Delta D$ are normally zero.

This advantage is a great feature of the control system of the present invention, making it possible to suitably adapt the invention to a fast response system.

Figure 3:
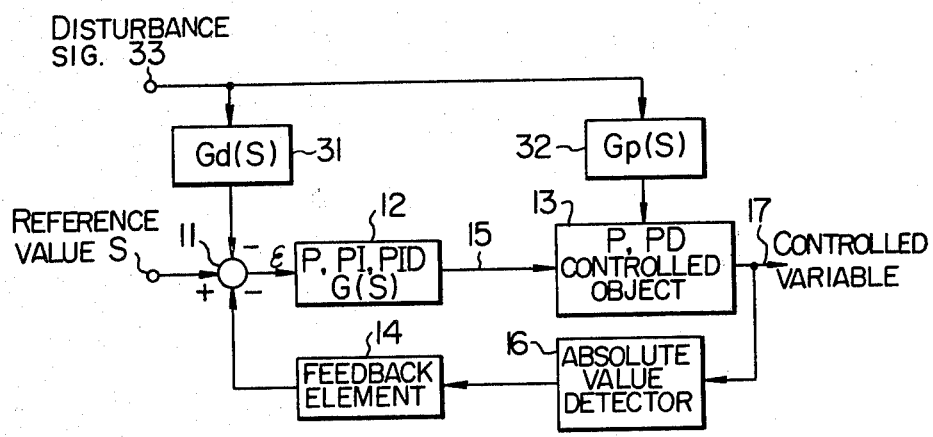
FIG. 3 is a block diagram showing an example of a prior art feedforward-feedback control system.

Solely for the purposes of comparison, a conventional feedforward-feedback control system is illustrated in FIG. 3, featuring suitable processing of measurable disturbances and application of processed results to a control element. However, when taking into account the deviation at the point 11 upon disconnection of the feedback loop, it is obvious that this conventional type is essentially different from the control system of the present invention.

More particularly, with reference to FIG. 3, the normal operation is performed in a feedback fashion with the same components as those of FIG. 1 and upon application of disturbances to a terminal 33, their influence is exerted on a controlled object 13 via a transfer element 32.

Since the influence on the controlled object is examined in advance, the manipulation variable is so varied as to cancel this influence by means of a transfer element 31. Accordingly, this conventional feedforward-feedback control system is essentially based on the feedback control of FIG. 1 and totally different from the control system of the present invention wherein the control operation for the deviation in respect of the absolute reference value is not carried out and the manipulation variable is separated irrespective of the detection of disturbances and applied to the controlled object.

In another convertional type, a disturbance adjuster is provided between blocks 12 and 13 in FIG. 1 to ensure that the feedback control operates to cancel the disturbance whereas the process control operates to eliminate removable disturbance. This conventional type is also different in natures from the control system according to the present invention.

Figure 4:
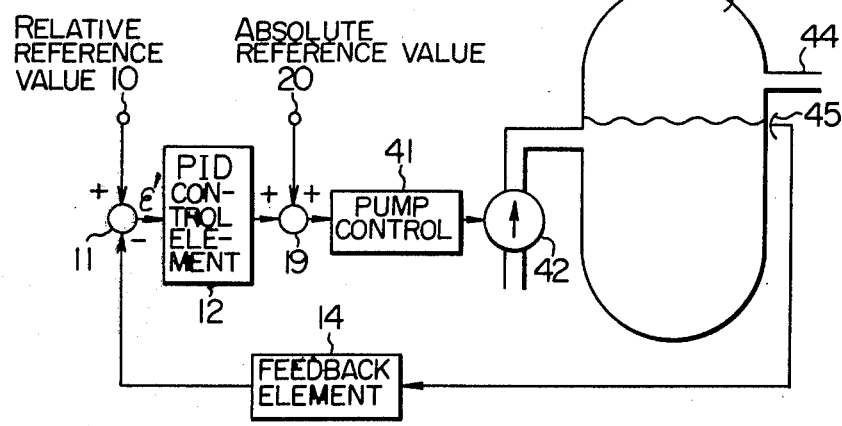
FIG. 4 is a block diagram of an implementation of the present invention as applied to a nuclear reactor feedwater control system.

Referring now to FIG. 4, an implementation of the invention as applied to control the water level will be described.

Specifically, illustrated in FIG. 4 is a control system which controls the water level of coolant in a nuclear boiler assembly 43 serving as a controlled system with high reliability. When neglecting variations in the water level with variations in pressure, the water level in the nuclear boiler assembly 43 is determined by the difference between flow rate of feedwater by a feed pump 42 and flow rate of aqueous vapor exhausted via an outlet 44 and to keep the water level constant, the feedwater flow rate of the pump 42 is controlled by a pump control 41.

It is assumed that during normal operation, a water level $L_o$ in the nuclear boiler assembly is 150 cm as measured from a fixed reference level and an allowable deviation $L_1$ from $L_o$ is ±20 cm. Then, in order for the control system to incorporate the present invention, an absolute reference value $C_1$ of 150 cm is applied to a absolute set-point terminal 20 and a relative reference value E which is normally zero is applied to a relative set-point terminal 10. Since safety of operation is absolutely required in the nuclear reaction furnace, it is necessary to keep the absolute reference value $C_1$ of 150 cm. The allowable change range is about 10%. For simplification, reference-value setting means are shown in the form of terminals 10 and 20.

A water-level detector 45 is provided to detect the relative water-level change and it produces an output signal which is zero when the actual water level is 150 cm. The water-level detector 45 may take the form of a strain gauge which detects the difference between a water pressure $P_o$ corresponding to the water level $L_o$ of 150 cm acting as a reference water level and a water pressure $P_x$ corresponding to the actual water level in the nuclear boiler assembly 43. A known displacement type liquid surface detector may otherwise be used wherein a float is placed in a detecting portion and a displacement of the float is measured when buoyancy of the float proportional to the liquid surface balances a counter force of a spring member.

If the reference value of water level is desired to be varied frequently, means may obviously, be employed to vary the bias for adjustment of the output. Various types may be employed for a control element 12 but a PID operation type will be described herein.

When the flow rate of aqueous vapor increases and the water level is lowered below the reference water level, $L_o$=150 cm, the detector 15 produces a negative output and the PID control element 12 is applied, via a feedback element 15 and irrespective of a transfer function of the element, with a positive deviation signal $\epsilon'$ which is in one-to-one correspondence with the decrement of water level.

The PID control element produces an output signal in accordance with its input signal and eventually, the pump control 41 causes a increased pump flow rate through actuatation of pump speed control, valve opening control and the like. As a result, the increased flow rate recovers the water level to the normal level of 150 cm as measured from the fixed reference level.

In this manner, according to the control system of the present invention, not the deviation between the reference value level and the actual level but the difference or deviation between the relative reference value and the relative level is subjected to the PID operation. Therefore, even in the event that the feedback loop, for example, the water-level detector gets out of order and as a result the relative water level signal becomes zero, no disturbance is exerted on the system so long as the water level in the nuclear boiler assembly coincides with the reference value. Thus, dangerous runaway in the water level control is prevented.

When a temporary variation in the operation water level is desired, a signal representative of the corresponding change is applied to a relative reference value set terminal 10 shown in FIG. 4 and a controlling operation similar to the above is executed. The changed relative reference value E can be adjusted within the allowable change range $\sigma$. When a program operation is required for set point $C_1$, the technique may be utilized of for example, U.S. Pat. No. 3,424,653 entitled "Method for start-up of a nuclear reactor utilizing a digital computer".

Figure 5:
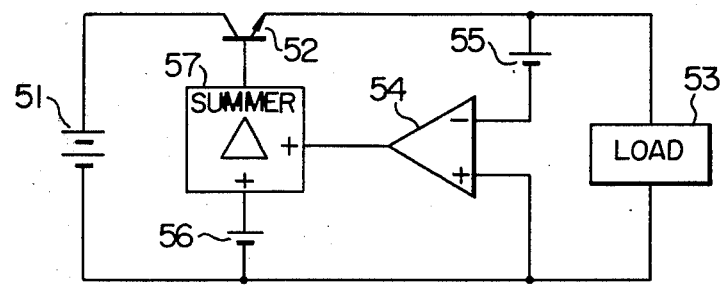
FIG. 5 is a circuit diagram of another implementation of the present invention as applied to a DC regulated power supply.
Figure 6:
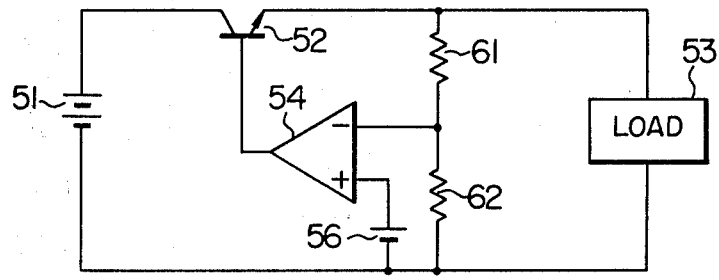
FIG. 6 is a circuit diagram showing an example of prior art DC regulated power supply.

Another implementation of the present invention as applied to a quick response voltage control will be described with reference to FIG. 5 and in comparison with a prior art example as shown in FIG. 6.

In circuit arrangements for series DC voltage regulation as shown in FIGS. 5 and 6, voltage of a non-stabilized power supply 51 is stabilized by a transistor 52 connected in series therewith and supplied to a load 53 such as a semiconductor integrated circuit.

In the circuit arrangement in accordance with the prior art feedback control system, as shown in FIG. 6, a reference voltage source 56 is compared with a voltage of the present output divided by resistors 61 and 62 in a comparator circuit 54 of, for example, an operational amplifier, and the equivalent resistance of the transistor 52 is varied to stabilize the output voltage.

With this circuit, since the difference between the reference voltage as defined by the voltage source 56 (corresponding to the reference value S in FIG. 1) and the divisional output voltage is fed back, the output voltage for the load approximates the voltage of the power supply 51 in the event of, for example, disconnection of the resistor 61 and consequently immediate breakdown of the load 53 such as integrated circuit results. An additional problem that the output voltage falls to approximate zero arises when the resistor 62 is disconnected.

In the control system of the present invention as shown in FIG. 5, on the other hand, voltage of the non-stabilized power supply 51 is set to, for example, 10 V and one input (for detection of the output voltage) to the comparator circuit 54 as defined by a bias voltage 55 is set such that the output voltage of operational amplifier 54 becomes zero when the output voltage for the load 53 is, for example, 5 V and the reference voltage 56 is, for example, 5.6 V.

Accordingly, the output of the comparator circuit 54 is normally zero and voltage corresponding to the reference value in FIG. 1 is delivered out of the reference voltage source 56 to control the output voltage.

When load current increases and the output voltage tends to decrease, the output of the comparator circuit 54 is rendered positive and the output of an adder circuit 57 is increased to keep the output voltage stabilized. The adder circuit 57 may comprise an operational amplifier. In the event of accidental disconnection of the bias voltage 55, the output voltage for the load 53 remains substantially unchanged in the absence of disturbances, thereby protecting the load 53 from being damaged.

As described above, the present invention is applicable to control systems with feedback loops irrespective of type thereof and has an extensive field of applications.

One advantage of the control system incorporating the present invention resides in improvement in accuracies of control.

To detail, in contrast to the prior art control system which requires uniform accuracies of detection throughout the overall range of change of the controlled variable, the control system of the present invention, as will be seen from the foregoing embodiments, employs the detector which is adapted to detect only the relative change of the controlled variable. Therefore, the detection range of this detector can advantageously be minimal, making it possible to assure highly accurate detection and consequent improvement in accuracies of the control system. Take measurement of one meter length, for example. If measurement of 10 cm length is sufficient to estimate the overall length of 1 m, the resolution of the measurement will duly be improved. This analogically applies to the control system of the present invention.

As has been described, the present invention ensures, in addition to the same control function as the prior art control system, a fail-safe function by which the system in normal operation can be protected from disturbances even in the event of accidental disconnection of the detector for detecting the controlled variable, thereby having beneficially meritorious applications in various automatic control systems.

While in the foregoing the relative reference value is normally rendered zero, it is possible, when the reference value is digitized, to separate the manipulation variable into a high order variable and a low order variable and to apply the low order variable to the relative reference value input terminal within the range at which the adverse effect of feedback signal disconnection is can be neglected.

I claim:

1. A manipulation-variable separated type control method for controlling, in a control system with a control element and a feedback element, a manipulation terminal for an object being controlled or a controlled object based on a result of a comparison of a controlled-variable detection signal from the controlled object with a set signal, comprising the steps of:
   (a) setting an absolute reference value $C_1$ for a manipulation variable and a relative reference value for the controlled variable under the condition that a relative change $C_2$ of the manipulation variable depending upon a deviation from the relative reference value is established to satisfy $C_1 \gg C_2$;
   (b) detecting a relative change of an actual controlled variable of said controlled object with respect to a reference value of the controlled variable;
   (c) calculating the relative change $C_2$ of the manipulation variable by means of the control element from a deviation between the detected change for the controlled variable and said relative value; and
   (d) superimposing the relative change $C_2$ for the manipulation variable on the absolute reference value $C_1$ independent of detection of disturbance to produce a total manipulation variable and supplying the total to the controlled object.

2. A control method according to claim 1 further comprising variably determining said relative reference value in accordance with an allowable change range of the controlled variable for said controlled object, and fixedly predetermining said absolute reference value in accordance with the reference value for the controlled variable at the time of normal operation of the controlled object, whereby a rapid change of the controlled variable with time is prevented in the event that a maximum disturbance occurs.

3. A control method according to claim 2 wherein said allowable change range $\sigma$ is represented by $$\sigma \leq \left| \frac{L_o - L_1}{\Delta t} \right|,$$

where $L_o$ is a reference value for the controlled variable, $L_1$ is an allowable change of the reference value, and $\Delta t$ is a response time of the object.

4. A control method according to claim 1 further comprising setting said relative reference value at zero and setting said absolute reference value in accordance with the setting of a detection reference for said relative reference value, whereby operation of the controlled object is programmable.

5. A control method according to claim 1, 2, 3 or 4 wherein said control element has transfer functions for a proportional operation, an integral operation and a derivative operation either singly or in combination.

6. A manipulation-variable separated type modified feedback control system comprising:
   (a) an object being controlled or a controlled object;

(b) control element means having a transfer function for a proportional operation, an integral operation and a derivative operation either singly or in combination;

(c) feedback means for feeding back a physical quantity detected from the controlled object;

(d) relative value detecting means provided at the controlled object for detecting a relative change deviated from a reference value for the controlled variable of the controlled object;

(e) first adder means with one input for receiving a relative value output from the detecting means through the feedback means and another input for receiving a relative reference value for the controlled variable, for generating a deviation between the two inputs;

(f) first setting means for setting the relative reference value;

(g) second adder means with one input for receiving an output from said control element means connected to receive the deviation output of the first adder means and another input for receiving an absolute reference value, for generating an output representative of a totalized manipulation variable obtained from superposition of the two inputs irrespective of detection of disturbance; and (h) second setting means ($C_1$) for setting the absolute reference value for the manipulation variable, whereby the absolute reference value ($C_1$) for the manipulation variable and the change ($C_2$) of the manipulation variable determined by the deviation from the relative reference value for the controlled variable are established to satisfy at least the relation which is $C_1 >> C_2$ and the total manipulation variable is the sum of divisions $C_1$ and $C_2$.

7. A control system according to claim 6 wherein said second setting means is cooperative with said relative value detecting means to change a reference value for the detection of the controlled variable by the detector in accordance with a change of the absolute reference value for the manipulation variable so as to make the output of the first setting means zero or approximation thereof.

8. A control system according to claim 7 wherein said second setting means is connected to absolute reference value generator means which is program-controlled.

9. A control system according to claim 6 wherein said second setting means is fixed to a value corresponding to a safe reference value for the controlled variable in the presence of a maximum disturbance, and said first setting means is variably set within an allowable range of change per unit time of the controlled variable dependent on the controlled object.

* * * * *